United States Patent
Tsukioka

[11] Patent Number: 5,643,667
[45] Date of Patent: Jul. 1, 1997

[54] HOT STAMP MATERIAL

[75] Inventor: Tadao Tsukioka, Gifu, Japan

[73] Assignee: Kabushiki Kaisha Tsukioka, Gifu, Japan

[21] Appl. No.: 366,287

[22] Filed: Dec. 29, 1994

[30] Foreign Application Priority Data

Dec. 30, 1993 [JP] Japan .................. 5-354121
Nov. 16, 1994 [JP] Japan .................. 6-308095

[51] Int. Cl.$^6$ .................. B32B 15/04; B44C 1/14
[52] U.S. Cl. .................. 428/344; 428/352; 428/354; 428/200; 428/209; 428/447; 428/450; 428/457; 428/467; 428/334; 428/913; 428/914; 426/383
[58] Field of Search .................. 428/344, 352, 428/354, 355, 447, 448, 450, 457, 467, 497, 332, 334, 200, 209, 915, 914; 426/383, 420, 811

[56] References Cited

U.S. PATENT DOCUMENTS

| 3,708,320 | 1/1973 | Hurst et al. | |
|---|---|---|---|
| 4,275,116 | 6/1981 | Krätschmer | 428/336 |
| 4,397,871 | 8/1983 | Meyer et al. | 426/5 |
| 4,892,602 | 1/1990 | Oike et al. | 156/233 |
| 5,035,907 | 7/1991 | Phillips et al. | 426/383 |
| 5,334,404 | 8/1994 | Garcia et al. | 426/383 |

FOREIGN PATENT DOCUMENTS

| 1146798 | 6/1989 | Japan . |
| 2265435 | 10/1990 | Japan . |
| 6125719 | 5/1994 | Japan . |
| 6255233 | 9/1994 | Japan . |

Primary Examiner—Patrick Ryan
Assistant Examiner—Marie R. Yamnitzky
Attorney, Agent, or Firm—Morrison Law Firm

[57] ABSTRACT

A hot stamp material is provided which includes a base; an inner release layer; an intermediate layer composed at least one gold and silver coating and an outer adhesive layer composed of edible material, wherein the inner release layer together with the intermediate layer and the outer layer are laminated on the base. According to a feature of the present invention, the hot stamp material can further include an additional color layer. The color layer may interposed between the inner release layer and the intermediate layer or between the intermediate layer and the outer adhesive layer or on both sides of the intermediate layer.

13 Claims, 9 Drawing Sheets

HOT STAMP MATERIAL

BACKGROUND OF THE INVENTION

The present invention is directed to a hot stamp material, which is useful for hot stamping foods. The hot stamp material can also be used for hot stamping beverages and other liquid material by means of a water-soluble edible film stamped with the hot stamp material.

Previously described hot stamp materials which utilize one of gold and silver material include a base film, a release layer, a film of gold or silver, which is vapor-deposited on the base film and an adhesive layer, which are sequentially laminated.

Conventional hot stamping methods encompass stamping a substrate with the hot stamp material, such that the gold or silver film is generally released from the base film. The release of the gold or silver film, in turn, causes the adhesive layer, which is generally coated on the gold or silver film, to undergo a conformational change. The resulting conformational change, in turn, enables the adhesive layer to effectively attach the gold or silver film to the underlying substrate. The gold or silver film is thus hot-stamped.

However, conventional hot stamps can not be used to hot stamp foods and beverages, due, in part, to the toxicity of the adhesive layer. Accordingly, the inherent toxicity of the adhesive layer, makes conventional hot stamping material uneatable and toxic to mammals including humans. As such, prior art hot stamp materials are not useful for hot stamping edible items for consumption by mammals including humans, such as, food and beverages.

The toxicity of previously described adhesive layers included in conventional hot stamp materials derives from the various thermoplastic synthetic resins and organic solvents, which are essential components of conventional hot stamping materials.

Accordingly, conventional hot stamping materials can not be used to hot stamp intricate gold or silver prints or designs onto edible items. In recent years, characters, patterns or designs composed of gold etc. have found widespread use in decorating various substrates. The increased demand for decorative hot stamps useful for decorating edible substrates has created a need for a hot stamp material useful for decorating edible food items including beverages.

Previous attempts at stamping intricate designs and patterns composed of gold and silver onto edible items have so far been unsuccessful. One such method for hot stamping intricate characters, patterns and designs onto edible items, e.g., beverages, proposes cutting the design of interest by means of a sharp blade or object from a sheet of beaten or rolled gold foil. This step is then followed by floating the design in a beverage.

Unfortunately, this method is both costly and labor intensive. Due to the extensive manual labor involved in practicing this method, the overall cost of hot stamping edible items is greatly increased with an attendant decrease in the overall production of the desired method.

The prior art method is also not suitable to quickly form complex or small and fine characters, patterns or designs. Additionally, the prior art method is also unsuitable for mass production. The present invention aims to overcome the above-mentioned drawbacks.

OBJECTS AND SUMMARY OF THE INVENTION

It is an object of the present invention to provide a hot stamp material which can be used to imprint characters, patterns or designs in the form of an edible gold or silver film, onto edible items including edible films.

Another object of the present invention is to provide edible materials including foods and water-soluble films that are hot-stamped with the hot stamp material.

Still a further object of the present invention is to provide drinkable or edible materials including foods or beverages that are provided with the water-soluble edible film hot-stamped with the hot stamp material.

Briefly, there is provided a hot stamp material which includes a base; an inner release layer; an intermediate layer containing at least one gold and silver and an outer adhesive layer composed of edible material, wherein the inner release layer together with the intermediate layer and the outer adhesive layer are laminated on the base.

According to a feature of the present invention, the hot stamp material can further include an additional color layer. The layer may be interposed between the inner release layer and the intermediate layer or between the intermediate layer and the outer adhesive layer or on both sides of the intermediate layer.

According to an embodiment of the present invention, there is provided a hot stamp material which includes a base, an inner release layer consisting essentially of at least one material selected from the group consisting of food additives, edible materials, and materials effective for coating food wrapping materials, an intermediate layer composed of at least one of gold and silver coating, an outer adhesive layer composed of edible material, wherein each of the inner release layer, intermediate layer and outer adhesive layer are laminated on the base.

According to another embodiment of the present invention there is provided a hot stamp material which includes a base, an inner release layer consisting essentially of at least one material selected from the group consisting of food additives, edible materials, and materials effective for coating food wrapping materials, an intermediate layer including a foil composed of at least one of gold and silver, and an outer adhesive layer composed of edible material, wherein each of the inner release layer, intermediate layer and outer adhesive layer are laminated on the base.

According to another embodiment of the invention, there is provided an edible material imprinted with at least one layer of one of gold and silver on at least one surface of the edible material, by means of a hot stamp which includes a hot stamp material, wherein the hot stamp material comprises a base, an inner release layer consisting essentially of at least one material selected from the group consisting of food additives, edible materials, and materials effective for coating food wrapping materials, an intermediate layer composed of at least one of gold and silver coating, an outer adhesive layer composed of edible material, and wherein each of the inner release layer, intermediate layer and outer adhesive layer are laminated on the base.

According to another embodiment of the invention, there is provided an edible material imprinted with at least one layer of one of gold and silver on at least one surface of the edible material, by means of a hot stamp which includes a hot stamp material, wherein the hot stamp material includes a base, an inner release layer consisting essentially of at least one material selected from the group consisting of food additives, edible materials, and materials effective for coating food wrapping materials, an intermediate layer including a foil composed of at least one of gold and silver, an outer adhesive layer composed of an edible material, wherein each of the inner release layer, intermediate layer and outer adhesive layer are laminated on the base.

According to another embodiment of the invention, there is provided an edible material imprinted with at least one image of one of gold and silver on both surfaces of the edible material, by means of a hot stamp which includes a hot stamp material, wherein the hot stamp material includes a base, an inner release layer consisting essentially of at least one material selected from the group consisting of food additives, edible materials, and materials effective for coating food wrapping materials, an intermediate layer composed of at least one of gold and silver coating, an outer adhesive layer composed of edible material, and wherein each of the inner release layer, intermediate layer and outer adhesive layer are laminated on the base, wherein the edible material includes the imprint on both sides According to another embodiment of the invention, there is provided an edible material imprinted with at least one image of one of gold and silver on both surfaces of the edible material, by means of a hot stamp which includes a hot stamp material, wherein the hot stamp material includes a base, an inner release layer consisting essentially of at least one material selected from the group consisting of food additives, edible materials, and materials effective for coating food wrapping materials, an intermediate layer composed of at least one of gold and silver foil, an outer adhesive layer composed of edible material, and wherein each of the inner release layer, intermediate layer and outer adhesive layer are laminated on the base, wherein the edible material includes the imprint on both sides.

According to another embodiment of the invention, there is included a water soluble material imprinted with at least one layer of one of gold and silver on at least one surface of the water soluble material, by means of a hot stamp which includes a hot stamp material, wherein the hot stamp material includes a base, an inner release layer consisting essentially of at least one material selected from the group consisting of food additives, edible materials, and materials effective for coating food wrapping materials, an intermediate layer composed of at least one of gold and silver coating, an outer adhesive layer, wherein the adhesive layer is shellac, and wherein each of the inner release layer, intermediate layer and outer adhesive layer are laminated on the base.

According to another embodiment of the invention, there is provided a water soluble material imprinted with at least one layer of one of gold and silver on at least one surface of the water soluble material, by means of a hot stamp which includes a hot stamp material, wherein the hot stamp material includes, a base, an inner release layer consisting essentially of at least one material selected from the group consisting of food additives, edible materials, and materials effective for coating food wrapping materials, an intermediate layer including a foil composed of at least one of gold and silver, an outer adhesive layer, wherein the adhesive layer is shellac, wherein each of the inner release layer, intermediate layer and outer adhesive layer are laminated on the base.

According to another embodiment of the invention, there is provided a water soluble material imprinted with at least one image of one of gold and silver on both surfaces of the water soluble material, by means of a hot stamp which includes a hot stamp material, wherein the hot stamp material comprises, a base, an inner release layer consisting essentially of at least one material selected from the group consisting of food additives, edible materials, and materials effective for coating food wrapping materials, an intermediate layer composed of at least one of gold and silver coating, an outer adhesive layer composed of edible material, wherein each of the inner release layer, intermediate layer and outer adhesive layer are laminated on the base, wherein the water soluble material includes the imprint on both sides.

According to another embodiment of the invention, there is provided a water soluble material imprinted with at least one image of one of gold and silver on both surfaces of the water soluble material, by means of a hot stamp which includes a hot stamp material, wherein the hot stamp material includes a base, an inner release layer consisting essentially of at least one material selected from the group consisting of food additives, edible materials, and materials effective for coating food wrapping materials, an intermediate layer composed of at least one of gold and silver foil, an outer adhesive layer composed of edible material, and wherein each of the inner release layer, intermediate layer and outer adhesive layer are laminated on the base, wherein the water soluble material includes the imprint on both sides.

According to another embodiment of the invention, there is included a water soluble material imprinted with at least one layer of one of gold and silver on at least one surface of the water soluble material, by means of a hot stamp which includes a hot stamp material, wherein the hot stamp material includes a base, an inner release layer consisting essentially of at least one material selected from the group consisting of food additives, edible materials, and materials effective for use as food wrapping materials, an intermediate layer composed of at least one of gold and silver coating, an outer adhesive layer formed of an edible adhesive, and wherein each of the inner release layer, intermediate layer and outer adhesive layer are laminated on the base.

According to another embodiment of the invention, there is provided a water soluble material imprinted with at least one layer of one of gold and silver on at least one surface of the water soluble material, by means of a hot stamp which includes a hot stamp material, wherein the hot stamp material includes, a base, an inner release layer consisting essentially of at least one material selected from the group consisting of food additives, edible materials, and materials effective for coating food wrapping materials, an intermediate layer including a foil composed of at least one of gold and silver, an outer adhesive layer, wherein the adhesive layer formed of an edible adhesive, wherein each of the inner release layer, intermediate layer and outer adhesive layer are laminated on the base.

According to another embodiment of the invention, there is provided a water soluble material imprinted with at least one image of one of gold and silver on at least one surface of the water soluble material, by means of a hot stamp which includes a hot stamp material, wherein the hot stamp material comprises, a base, an inner release layer consisting essentially of at least one material selected from the group consisting of food additives, edible materials, and materials effective for coating food wrapping materials, an intermediate layer composed of at least one of gold and silver coating, an outer adhesive layer composed of edible material, wherein each of the inner release layer, intermediate layer and outer adhesive layer are laminated on the base, wherein the water soluble material includes the imprint on both sides.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

To achieve the above objects, the present invention provides, a hot stamp material structure comprising a base, an inner release layer, an intermediate layer, and an outer adhesive layer composed of edible material, wherein the release layer, the intermediate layer, and the adhesive layer are laminated sequentially on the base. (hereinafter referred to as "basic structure"). The term outer adhesive layer composed of edible material includes an adhesive layer formed of an edible adhesive, wherein the edible adhesive includes at least one edible material.

The inner release layer includes at least one material selected from the group consisting of food additives, at least one edible material, and materials capable of being used to coat food wrapping materials.

Preferably, the inner release layer is formed essentially of silicone, which can be used food wrapping material.

The intermediate layer is composed of at least one of gold and silver, wherein the layer of one of gold includes pure gold or high-grade gold, while the silver layer may include pure silver or high-grade silver.

The intermediate layer containing one of gold and silver layer are preferably formed by vacuum deposition or sputtering. Alternatively, the intermediate layer may be replaced with a sheet of one of gold and silver, wherein the sheet is beaten or rolled into a foil having a predetermined thickness.

The basic structure may further include a color layer to enhance the overall appearance of the intermediate gold or silver layer. The color layer is preferentially interposed between the release layer and the intermediate layer composed of one of gold and silver layer. Alternatively, the color layer may be interposed between the intermediate layer and one of an adhesive layer and an adhesive layer composed of edible material. Alternatively, the color layer may be included on both a top and bottom side of the intermediate layer.

The adhesive layer is formed of an edible adhesive, preferably containing shellac, which is non-toxic to mammals including humans.

Edible refers to that property which includes ingestion of a material which is not harmful to mammals including humans. Edible collectively refers to any material that may be ingested in either liquid or solid form or any other form suitable to mammals including humans, and includes beverages.

Preferred embodiments of the present invention are described hereinafter with reference to the attached drawings. Adhesive layer 9 may include an adhesive layer formed of edible material.

Figure 1:
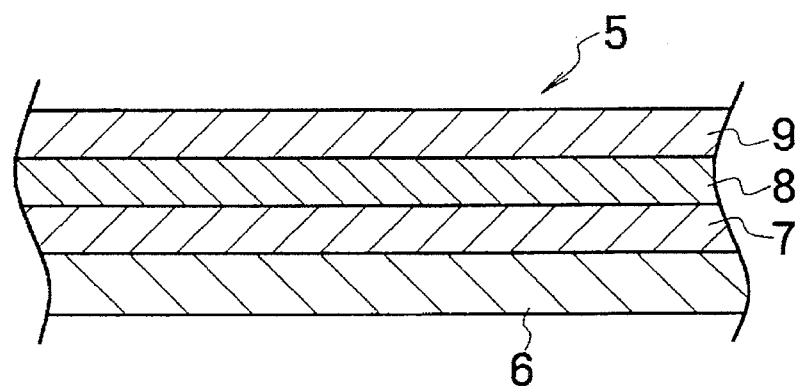
FIG. 1 is an enlarged cross-sectional view of an embodiment of the presently claimed hot stamp material.

Referring to FIG. 1, a hot stamp material 5 includes a base 6, an inner release layer 7, an intermediate layer 8 and an outer adhesive layer 9 which are sequentially laminated in that order. FIG. 1 illustrates the order in which the release layer 7, intermediate layer 8 and outer adhesive layer 9 are sequentially laminated onto base 6. It is noted that FIG. 1 does not show the actual thicknesses of each respective layer. Indeed, FIGS. 5, 8–14 and 18–20 also do not accurately show the actual thicknesses of the various layers.

Base 6 is substantially heat resistant, transparent, pressure resistant, and releasability resistant. Examples of materials suitable for use as base 6 include paper and plastic films made of polyester, polypropylene, polycarbonate, polyamide and polyethyleneterephthalate.

The thickness of base 6 is preferably from about 10 to about 30 microns if made from a plastic film, and about 40–70 microns if composed of paper and similar materials. It is understood that base 6 need not be limited to the above-mentioned ranges. It is preferred that the paper used for base 6 be free of substances toxic to mammals including humans, such as fluorescent dyes, formalin, and polychlorobiphenyl (PCB).

Preferred examples of a suitable paper include glassine paper, cellophane paper and paraffin paper. However, other types of paper may also be used including a roll or a cut sheet.

Inner release layer 7 consists essentially of a silicone-type release agent or a silicone capable of being used to coat food wrapping material. Inner release layer 7 may also be formed of a food additive or other edible material. Other edible materials suitable for use as an inner release layer 7 according to the present invention include a silicone type defoaming agent or defoamer.

The amount of material applied to form the release layer 7 preferably ranges from about 0.05 to about 1.5 gram per square centimeter, if the material is a silicone-type release agent. The present invention is not limited to the above-mentioned range so long as the thickness does not interfere with the operability of the release layer.

The method used to apply the silicone-type release agent to base 6 is preferably a printing method, such as gravure printing, silk printing or offset printing. Alternatively, the silicone-type release agent may be applied to base 6 by means of brushing or spraying.

The term "silicone" is normally understood to include organopolysiloxanes. However, the term "silicone" as used in this specification further includes organic silicon compounds and silanes without oxygen (silicon hydrides), and may exist in various forms, such as a resin, oil or rubber.

Dimethyl-type silicone is preferred as the release agent, because it has a small surface tension. Accordingly, it readily spreads into a thin film or coating, thereby effectively wetting the surface of an edible substrate when applied thereto. This effect is also observed when the surface of the substrate has micro-size undulations. Dimethyl-type silicone also has the advantage of possessing superior releasability, high heat resistance, together with being extremely resistant to denaturation and decomposition. Dimethyl-type silicone is also harmless when ingested by mammals including humans and can be handled safely.

The release agent for use in inner release layer 7 may further include a coating material suitable for a food wrapping material. Examples of such a suitable release agent include materials containing, as essential components, vinyl acetate resin, acrylic resin, copolymers of silicone resin and vinyl acetate resin, copolymers of silicone resin and acrylic resin, acrylic ester, and acrylate copolymers, all of which are suitable for use as a coating material for food wrapping materials. Further, the release agent may also be a surface active agent containing, silicone, a lubricant such as paraffine wax, fluorocarbon resin, and similar components.

Intermediate layer 8, which is composed of at least one of gold and silver coating (hereinafter collectively referred to as intermediate layer 8) is used to coat the underlying inner release layer 7, in one embodiment. It may be gold or silver-deposited onto release layer 7 by means of vapor deposition using a vacuum deposition apparatus, and similar components. The resulting gold or silver coating is characterized as being substantially pure wherein the level of purity of the coated layer is comparable to that of at least one of pure gold, silver, high-grade gold or high-grade silver.

For purposes of this invention, the terms "gold" and "silver" encompasses both pure gold and pure silver together with high-grade silver and high-grade gold with minimum impurities.

The thickness of intermediate layer 8 is preferably from about 400 to about 800 Å, although it is not limited to this range.

The method for coating intermediate layer 8 onto inner release layer 7 is not limited to vacuum deposition. Indeed, intermediate layer 8 may be coated on the underlying inner release layer 7 by one of sputtering, activated reaction deposition, ion plating and similar procedures. Sputtering provides an added advantage in allowing one skilled in the art to create an intermediate layer 8 wherein the gold or silver content includes a gold or silver content of about 99.99%.

Intermediate layer 8, need not necessarily be deposited on inner release layer 7. Instead, it can be manually placed on inner release layer 7 as one of a gold or silver sheet, beaten or rolled into a foil.

The beaten foil of one of gold and silver has a predetermined thickness, of from about 0.0001 to about 0.0002 mm, although the thickness need not be limited to this range.

The foil composed of one of gold and silver effective for use as intermediate layer 8, should be edible, in that the content of the gold or silver should be limited to a range which is not harmful to mammals including humans. Accordingly, a gold foil having a composition exemplified by 94.4% gold, 4.9% silver and 0.7% copper is preferable. The gold content in the foil should not be less than 94.4%, although it is not limited to this range.

Likewise, a silver foil suitable for use as intermediate layer 8 should preferably include pure silver or high-grade silver. The silver content of the silver foil is not limited to any particular range, so long as its content is not harmful to mammals including humans. The same holds true for one of a gold and silver coating.

In the event, intermediate layer 8 includes one of a gold and silver foil, it can be electrostatically attached to release layer 7 by carefully placing the foil on an electrostatically charged inner release layer 7. It is noted that such a procedure will inevitably result in some air being present in between release layer 7 and intermediate layer 8. In order to remove the sandwiched layer of air trapped in between release layer 7 and the gold or silver foil, the air is let out through numerous preexisting pin holes in the gold or silver foil. This allows for securely attaching one of a gold and silver foils onto release layer 7. The same holds true for one of a gold and silver coating.

As used herein, the term "coating" when used in reference to intermediate layer 8 means vacuum deposition, sputtering, or the like. Alternatively, the term "foil" when used in reference to intermediate layer 8 means a sheet or foil of gold or silver beaten to a predetermined thickness.

Adhesive layer 9 is formed by applying an edible adhesive. Examples of an edible adhesive suitable for adhesive layer 9 include at least one of starch syrup, processed starch, such as CMS (carboxymethyl starch), CMC (carboxymethyl cellulose), food gum, sodium alginate, food natural resin, and food natural products.

A preferred adhesive material is shellac. Shellac is a resin secreted by the lac scale insect (Coccoidea). Shellac is characterized as having an appropriate thermal plasticity and thermal curability. Furthermore, shellac is harmless to mammals including humans and it readily adheres to the underlying substrate, which may include a coating or foil of intermediate layer.

Since shellac is readily soluble in alcohol, it is mechanically suitable for use in conjunction with an applying apparatus such as a coater. Indeed shellac is characterized as forming a tough coat when applied as a coating layer. Accordingly, coatings containing shellac provide for an improved means for preventing damage such as scratching to the adhesive layer.

If shellac is used to form adhesive layer 9, it is preferable to dissolve liquified shellac in ethanol in order to obtain from about 20 to about 40% shellac ethanol solution, followed by applying from about 1.5 to about 2.5 grams of the shellac solution per square meter. However, these values are not restrictive.

Adhesive layer 9 may be formed of other edible adhesives, such as powder of konjak (the starch of the devil's-tongue), gum arabic, soy bean, bean protein, egg white, starch powder of crawfish (Crustacea), kelp powder.

In one embodiment of the present invention, there is also provided an edible material. As used herein, "edible film/material" refers to a substance that is non-toxic to mammals including humans, when ingested. The edible material is exemplified by one of a water-soluble film and water-insoluble film. Water soluble and water-insoluble films are coated with a layer of one of gold and silver, which is then hot stamped by means of the hot stamp material. Water insoluble edible film refers to that property/film wherein the addition of a plasticizer such as one of olein acid, propylene glycol and shellac to the edible film makes the water soluble edible film insoluble in water.

Figure 2:
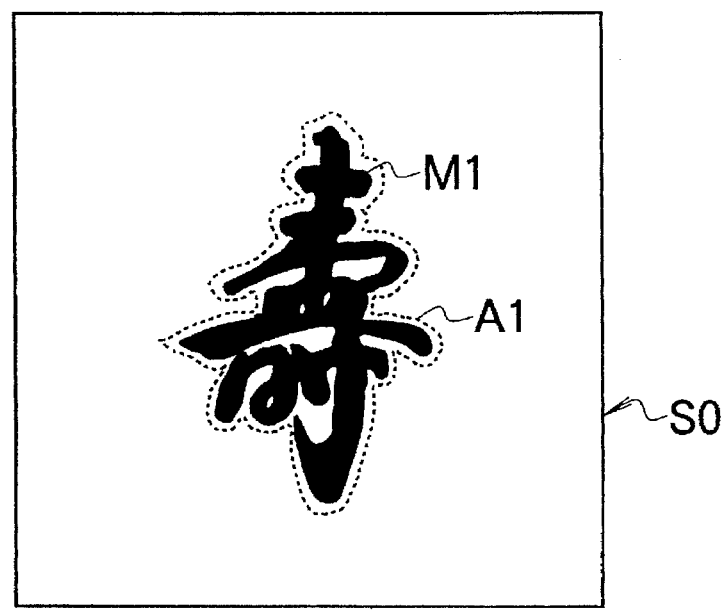
FIG. 2 is a front view of an edible film hot-stamped with an image, using the hot-stamp material of FIG. 1.

The water soluble edible material SO as shown in FIG. 2 is preferably formed essentially of a water-soluble natural polysaccharide obtained from starch, such as pullulan, agar etc. As such, the edible film SO is water soluble in a water bath having a temperature range of about 0° C. to 100° C.

Films of pullulan are used in many ways in the food industry. An advantage of using pullulan film is its high water solubility, high transparency and its suitability for printing. The edible materials of the invention are not limited to pullulan, and may comprise materials formed essentially of a medicinal wafer, collagen, gelatin, carrageenan, alginate, natural gum, etc.

When hot stamp material 5, comprising a foil as the intermediate layer is used to imprint food or other edible materials, a foil of pure or high-grade gold or silver separates from the hot stamping material together with an edible adhesive from inner release layer 7 and transfers to the food or substrate by means of the edible adhesive.

Alternatively, when a hot stamp material 5 comprising an intermediate layer of at least one of gold and silver coating is used to imprint a substrate such as food and other edible materials, hot-stamped, the intermediate layer of one of gold and silver coating together with the adhesive layer separates from by the release layer from the base.

As a result, the edible gold or silver image is transferred to and attached by means of the edible adhesive to food or other edible material such as an edible material.

An image of a character, pattern or design contained in the hot stamp, formed of gold or silver, is thus transferred to the substrate. The resulting hot-stamped image or imprint can thereafter be eaten together with the food.

Referring to FIG. 2, image M1, containing a character, a pattern or a design is imprinted on a film composed of at least one of pure gold and pure silver coating and is transferred to edible material SO with the aid of the hot stamp material 5.

Figure 5:
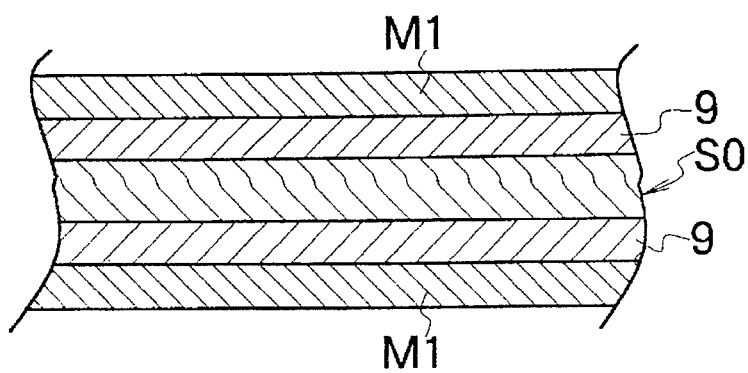
FIG. 5 is an enlarged cross-sectional view of an image of a character, pattern or design is imprinted on a film by means of the hot stamp material of FIG. 1.

Hot stamp material 5 may also be hot-stamped on either or both sides of the edible material SO. A pair of identical images M1, identical in size and shape, e.g., mirror images to each other, may be hot-stamped onto and attached by means of the adhesive layer 9 to both sides of edible material SO as shown in FIG. 5, such that the images M1 are substantially symmetrical about the plane of the edible material SO.

This configuration hides the adhesive layer 9 between the film SO and the hot-stamped images M1 so that it is hidden behind the images M1 and not visible from the outside. In addition, if an edible material, wherein entire surfaces of both sides thereof are hot-stamped, is cut into pieces and the pieces are placed in a beverage such as a liquor, the brightness of the gold or silver will show on both sides of each piece.

The bilaterally stamped edible material SO is not limited to identical images on both sides. For example, the bilaterally stamped edible materials SO may carry a gold imprint, hot-stamped on one side, and a silver imprint hot-stamped on the other side.

Further, the brightness of the gold or silver imprints used on each side may vary. Additionally, the colors of the films may also vary on either side. Thus, different types of imprints may be hot-stamped respectively on the sides of the edible material SO so as to produce a unique and fascinating image. An edible material SO having the entire surfaces of both sides thereof hot stamped with gold or silver imprints may also be folded as in paper folding craft and placed on a dish, achieving similar effects.

Figure 6:
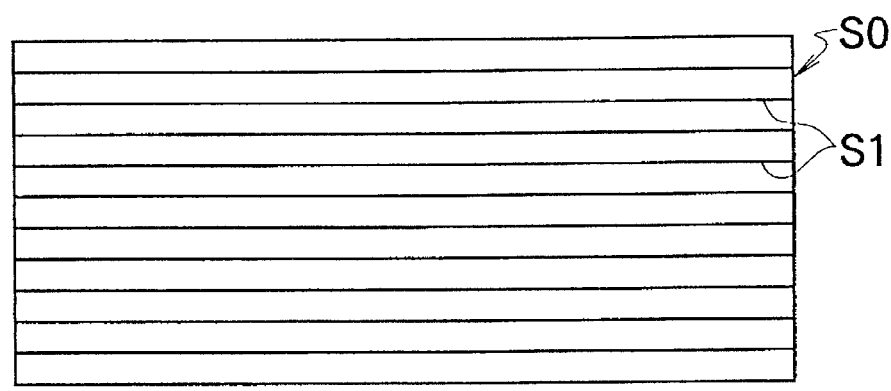
FIG. 6 is a plan view of a film in which the entire surfaces on both sides of the film are hot-stamped with a gold or silver film.
Figure 7:
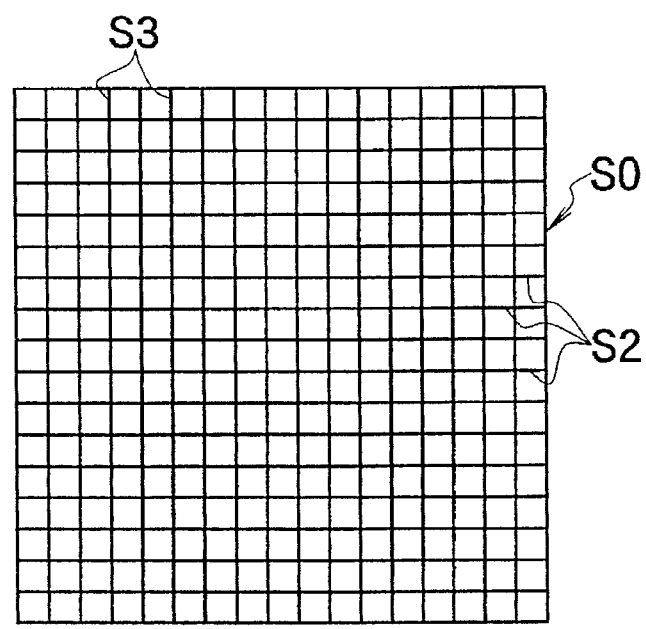
FIG. 7 is a plan view of a film in which the entire surfaces on both sides of the film are hot-stamped with a gold or silver film.

If an edible material SO having the entire surfaces of its two sides hot-stamped with gold or silver imprints is shredded with a cutting tool, such as a Thompson blade, along lateral lines S1 as shown in FIG. 6, or along lateral and longitudinal lines S2 and S3 as shown in FIG. 7, and the resulting shreds are put in a beverage such as a liquor, then the brightness or glitter of the gold or silver shows on both sides of each shredded edible material SO. Addition of a color layer is optional. However, the addition of a color layer interposed between the inner release layer and intermediate layer composed of one of gold and silver coating or between the intermediate layer composed of one of gold and silver coating and the adhesive layer, imparts unique features to the hot stamping material, which would otherwise be missing.

For example, a red color coated on top of or beneath intermediate layer 8 imparts a reddish tint to the intermediate layer 8. Likewise, a coating containing pearl powder when present on top of, or underneath the intermediate layer 8 composed of one of gold and silver coating, imparts a mixed appearance of pearl and gold or silver to the intermediate layer 8. According to another embodiment of the invention, there is provided a soluble edible material, wherein the hot-stamped edible material is capable of being removed from the underlying substrate while leaving behind the hot-stamped image still imprinted on top of the underlying substrate.

For example, if the water-soluble edible material is placed in a beverage, the film will dissolve to leave the gold or silver film containing the image floating (or sunk) in the beverage.

If a water-soluble edible material is placed on an edible substrate such as food having a high moisture content or food that eventually encounters a moist environment or one that is capable of absorbing substantial moisture such as steamed food or food being steamed in a steamer etc., then the film will dissolve while leaving its gold or silver imprint on the underlying edible substrate. Accordingly, the gold or silver image can be had or taken with the beverage or the food or the like.

If the edible material is formed mainly of pullulan, the film will have high water solubility, high transparency, and high printing or hot-stamping suitability.

If the edible material SO hot-stamped with the image M1 of a character, pattern or design that is formed of a gold or silver film is placed on moisture rich food, such as, and not by way of limitation, ice cream, cake frosting, agar, jelly, laver paste, fish, meat, fruit or food to which moisture has been added, such as rice cake pellets to which soy sauce is applied, then the edible material SO dissolves leaving the image M1 imprinted on the food. The image M1 of a gold or silver film attached to the food can be consumed together with the food. Additionally, the edible material SO will not be an obstacle when the food containing moisture, such as cake, is cut by using a knife.

Water-soluble edible material SO may be attached to food substrates such as a sweet bun or a candy, by steaming the food etc. with the water-soluble edible material SO attached thereto, e.g., in a steamer. Essentially, the steam dissolves the edible material SO leaving the gold or silver image attached to the food etc. In the case of bread, cake or similar edible items, the water-soluble edible material SO is placed on the dough prior to baking. After the dough is baked, a gold or silver image M1 of a character, pattern or design is left imprinted to the bread or the like. Thus, the gold or silver image M1 may be imprinted on the food either by baking or steaming.

If a water-soluble edible material is hot-stamped onto a substrate, the edible material can be easily removed to leave behind a hot-stamped image on the underlying substrate such as food and or a beverage etc.

Figure 3:
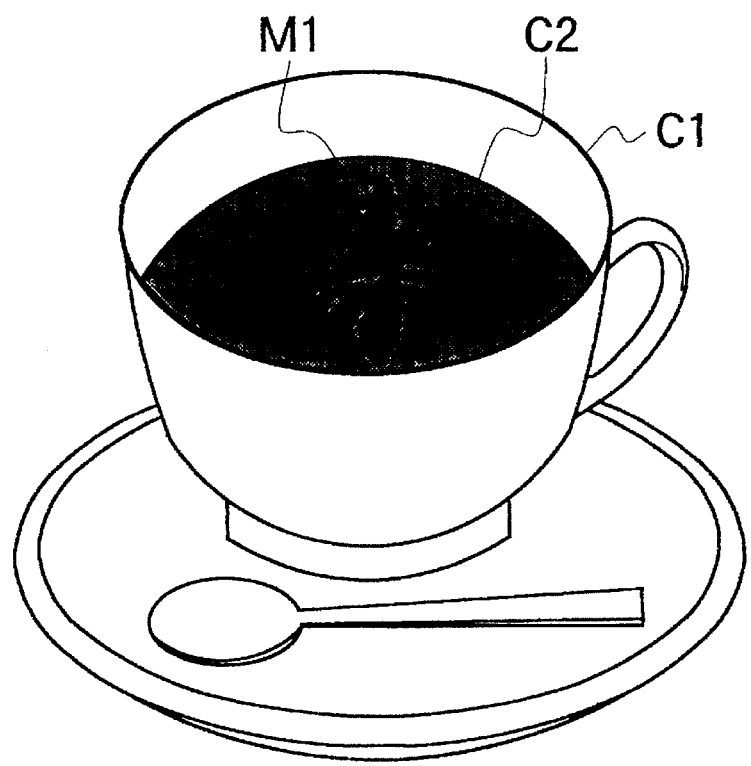
FIG. 3 is a perspective view of a container wherein an image imprinted on water-soluble film, which has dissolved, is seen floating in a beverage.

If the water-soluble edible material SO is placed in a liquid capable of being consumed by a human, for example and not by way of limitation, cold and hot water, soups, juice, coffee, tee, liquor, or tempura dip, the edible material SO dissolves leaving the image M1 floating on the surface of, or sunk in the liquid. Thus, the stamped image comprised of one of gold and silver is provided in the liquid and can be consumed. FIG. 3 shows an image M1 floating in coffee C2 in a cup C1.

The edible material SO may also be placed on, or along with, or mixed in various ethnic foods, such as Japanese, Chinese, French or Italian dishes. The edible material SO additionally may be placed on sushi laver sheets (sea weed sheets), cooked adzuki-bean rice, cooked white rice, etc.

Figure 4:
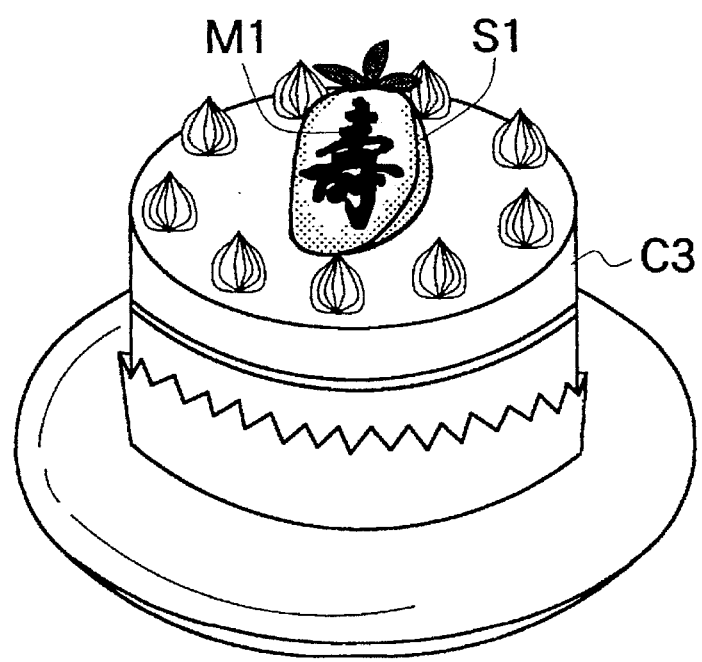
FIG. 4 is a perspective view of an image deposited on a substrate such as food after its underlying water-soluble film has dissolved by the moisture contained in the food.

The film SO may also be attached to materials other than food for decorative purposes. Furthermore, the image M1 of a character, pattern or design as shown in FIG. 2 may be cut out together with the edible material SO along a cutting line A1 surrounding the image M1 by using a cutting tool, such as a Thompson blade, this results allows the cut-out piece to be handled more easily, by means of fingers or college pliers. FIG. 4 shows a strawberry that is cut half and placed on top of a cake C3 and an image M1 attached to the cut surface of the strawberry.

The thickness of the water soluble edible material SO may vary. In a preferred embodiment, the water-soluble edible material SO has a sufficient thickness to facilitate handling the film SO by, e.g., fingers. For example, if the edible material SO is composed of starch, such as pullulan, the thickness thereof is preferably from about 20 to about 50 microns, to accommodate ease of handling and solubility concerns.

Shellac, forming the adhesive layer 9, does not readily adhere to pullulan but readily adheres to zein. Zein is usually coated on the pullulan film as a membrane which imparts superior adhesion properties to the pullulan so that the pullulan adheres sufficiently to the shellac. Zein is insoluble in water, but soluble in an ethanol solution of from 60 to 90 wt percent ethanol.

Accordingly, if a zein layer is provided on an edible material formed mainly of starch such as pullulan, a hot stamp material comprising an adhesive layer of shellac can be suitably used to hot-stamp the edible material with an imprint formed of the gold or silver film. Thus, when the edible material SO consists essentially of a starch such as pullulan, the edible material SO needs to have a zein layer R1. Shellac strongly adheres to the edible material SO composed of materials other than starch such as pullulan, therefore eliminating the need to have a zein layer.

It is preferable to apply about 20 wt % zein solution at a rate of about 1–2 gram per square meter to the edible material SO. However, the amount of zein applied is not restricted by these values.

In accordance with a feature of the present invention, the hot stamp material can be used to hot stamp an imprint of e.g., a character, pattern, or design on both edible and non-edible substrates. If the object to be hot stamped is an edible substrate, then the entire object, including the edible substrate and the gold or silver film can be eaten.

Further, the hot stamp material can be formed into an image, even a complicated or small and fine image, of a character, pattern or design without requiring an additional process of, for example, punching out or cutting out the image by using a blade, a knife or scissors.

Thus, the hot stamp material can provide a means for producing clear images at low costs. Also, because the hot stamp material is suitable for use in hot stamping substrates on a large scale, the hot stamp material enables mass-production of food or edible materials, such as edible materials, which are hot-stamped with gold or silver films.

Figure 8:
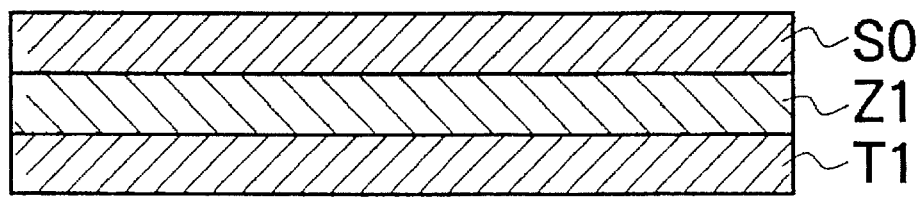
FIG. 8 is a cross-sectional view of a laminate including a film, an adhesive and a support for supporting the film by means of an adhesive.

To facilitate handling of the pullulan film SO, it may be stabilized by a support T1 made of a plastic film as in base 6 of hot stamp material 5, as shown in FIG. 8. The pullulan film SO is attached to the support T1 by means of a material Z1 with the pullulan film SO. Z1 is characterized as having poor adhesion properties sufficient to retain pullulan film SO on support T1. Material Z1 also prevents pullulan film SO from peeling off support T1 even when the film SO is manipulated with a tool such as college pliers. Thus, this method improves the ability of one to manipulate the pullulan film SO.

The material Z1 also prevents the pullulan film SO from peeling or shifting from the support T1 which might otherwise occur during transportation, and further prevents the pullulan film SO from curling away from its support T1 which would otherwise be caused by, for example, a change in humidity.

The adhesive properties of the material Z1 are such that it readily releases the pullulan film SO upon peeling. Similarly, if the hot-stamped laminate is cut by using a cutting tool, such as a Thompson blade, the pullulan film SO can be easily peeled from the support T1.

When the support T1 is made of paper or similar materials as in the base 6, there is no need to provide a material Z1 between the support T1 and the pullulan film SO.

Figure 9:
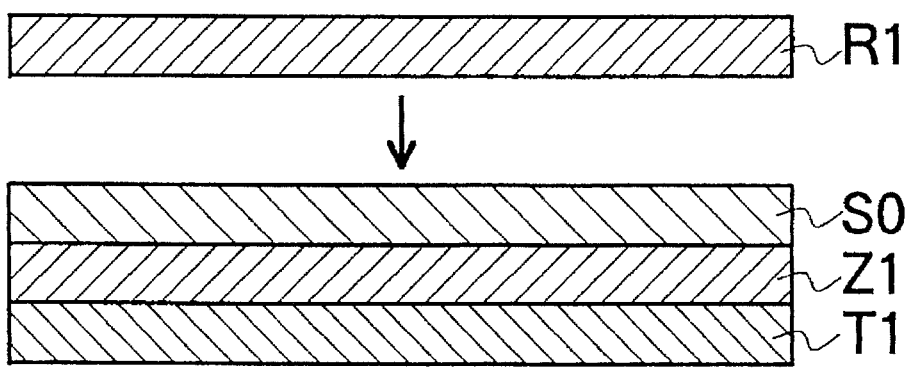
FIG. 9 illustrates a process wherein a zein layer is laminated on a film supported by a support by means of an adhesive.

If the hot stamp material 5 having an adhesive layer 9 formed of shellac is used to hot-stamp the edible (pullulan) film SO, it is preferred that a layer of zein R1 coat the top of the pullulan film SO supported by the support T1 by means of the sticky material Z1, as shown in FIG. 9. The layer R1 of zein, which is a protein from corn, is formed by applying a solution of zein and drying the applied solution.

Described hereinafter, are examples embodying a method for hot-stamping images composed of gold or silver on edible material SO composed mainly of a starch such as pullulan.

Figure 10:
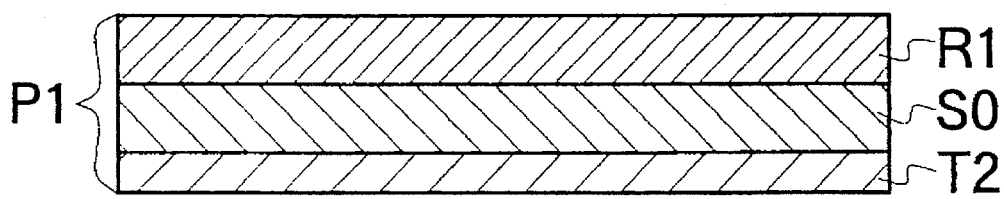
FIG. 10 is a cross-sectional view of a laminate which includes a layer of zein laminated on a film supported by a support.
Figure 11:
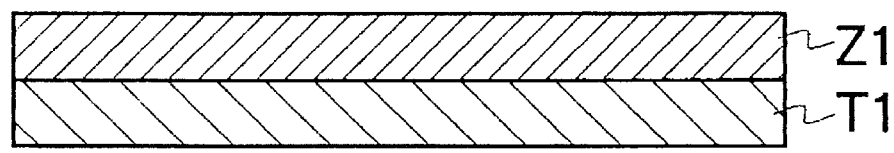
FIG. 11 is a cross-sectional view of a laminate wherein an adhesive is laminated on a support.

Initially, a laminate P1, shown in FIG. 10, is formed. Laminate P1 includes support T2 made of a polyester film or the like; edible material SO composed mainly of starch such as pullulan and supported by support T2; and a zein layer R1 formed on top of edible material SO. Thereafter, support T2 is removed from laminate P1. Laminate P1 is then laid over and attached to material Z1 without support T2, and supported by support T1, which is made of a polyester film or the like, in accordance with FIG. 11. The resulting laminate P2 is illustrated in FIG. 12.

Thus, material Z1 having poor adhesive properties is sandwiched between edible material SO and support T1. More specifically, zein layer R1, edible material SO, material Z1 with poor adhesion, and support T1 are sequentially laminated from top to bottom on the laminate P2.

Figure 12:
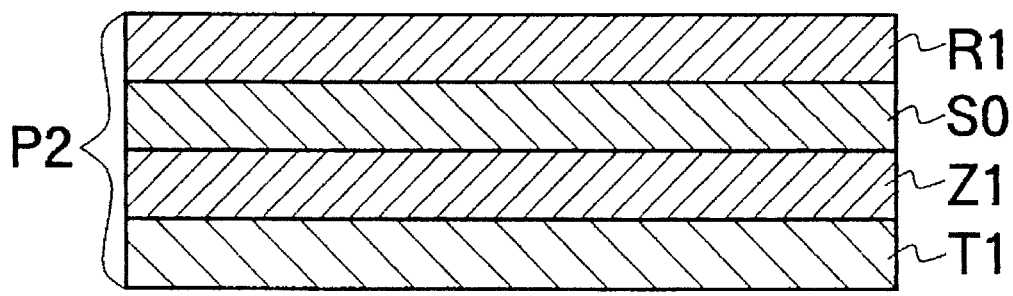
FIG. 12 is a sectional view of a laminate formed by sequentially laminating an adhesive, an edible film and a layer of zein on a support.
Figure 13:
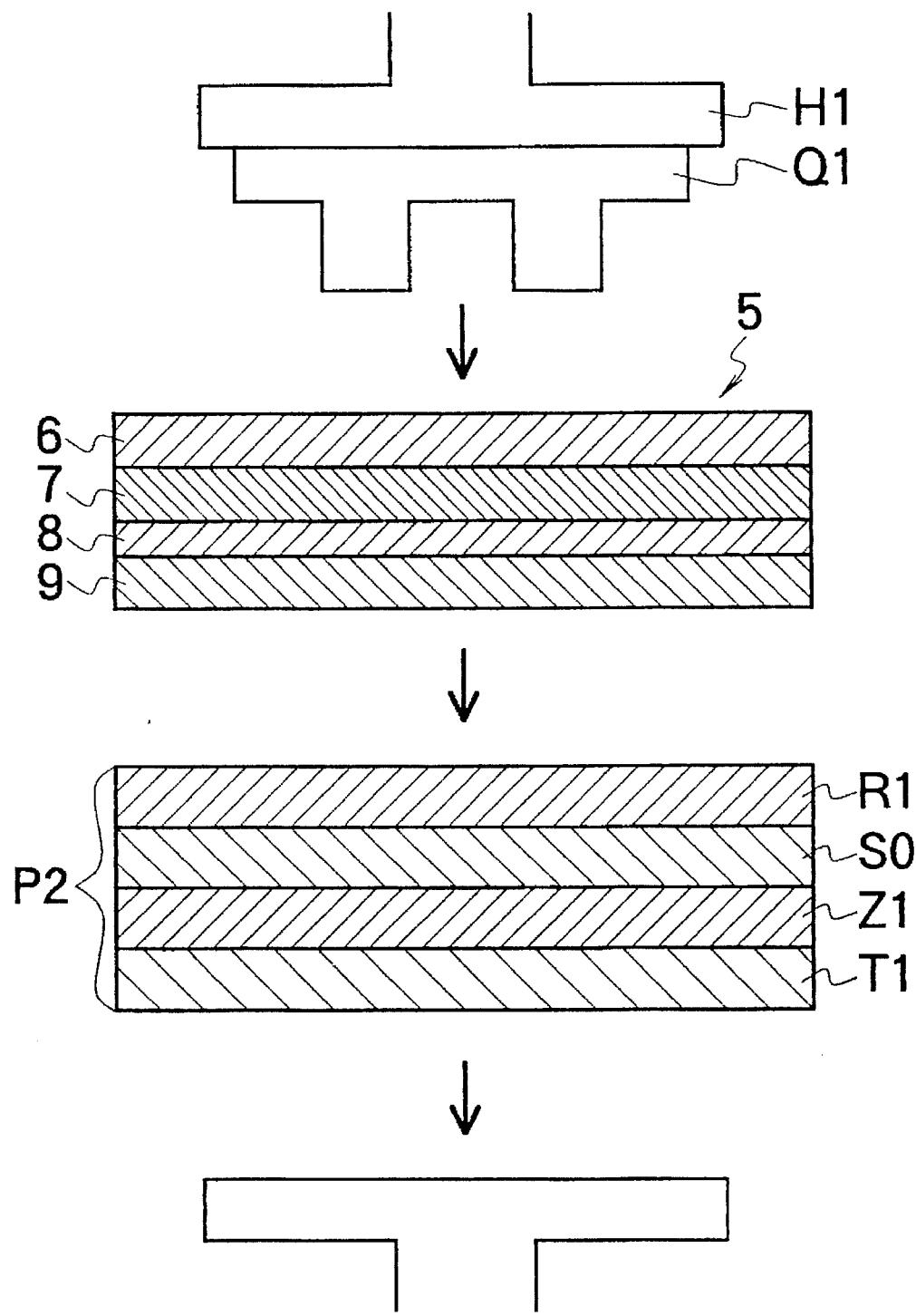
FIG. 13 illustrates a process in which a hot stamp material as shown in FIG. 1 is hot-stamped on a film including the layer of zein according to FIG. 12.

Referring to FIG. 13, hot stamp material 5 is laid over laminate P2 in accordance with FIG. 12, such that adhesive layer 9 is in a contacting relationship with zein layer R1. Hot stamp material, as noted previously, includes base 6, composed of a polyester film or the like; release layer 7 formed of a release agent, consisting essentially of one of silicone and acrylate copolymer; intermediate layer 8 composed of at least one of gold and silver; and adhesive layer 9, formed of.

Metal board Q1 heated by means of heating plate H1 is pressed onto hot stamp material 5 against laminate P2, thereby hot stamping laminate P2. This may be accomplished by means of an up-down hot-stamp apparatus. The hot stamp apparatus need not limited to the up-down apparatus, and may further include hot-stamping apparatus exemplified by a cylinder type, roll type, or rolling type.

After the hot stamping process, hot stamp material 5 is removed, leaving behind a hot-stamped imprint including intermediate layer 8 and adhesive layer 9, attached to laminate P2.

Figure 14:
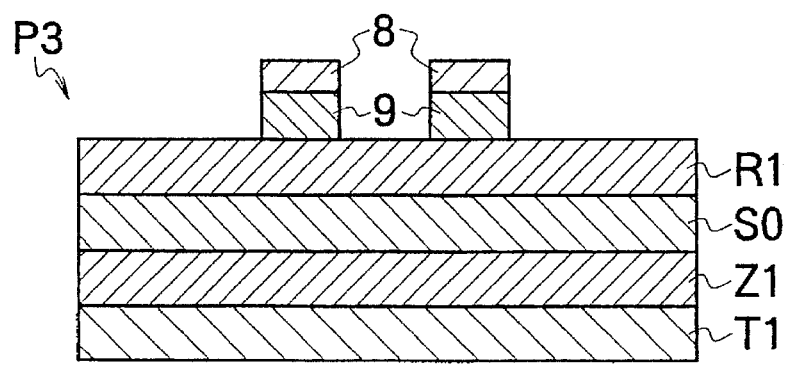
FIG. 14 is a cross-sectional view of a preformed print formed by hot-stamping the hot stamp material of FIG. 1 on the laminate of FIG. 12.

Referring to FIG. 14, a process for hot-stamping print P3 is shown. The process includes forming hot-stamped print P3 onto which support T1, material Z1, edible material SO, zein layer R1, adhesive layer 9 and intermediate layer 8 composed of at least one of gold and silver are sequentially laminated. Material Z1 is characterized as being weakly adhered to support T1.

During hot stamping P3 onto an edible substrate, portions of intermediate layer 8, composed of at least one of gold and silver, which includes image M1 corresponding to pattern R1 of metal plate Q1, is transferred to the substrate and attached to zein layer R1 by means of adhesive layer 9.

Figure 16:
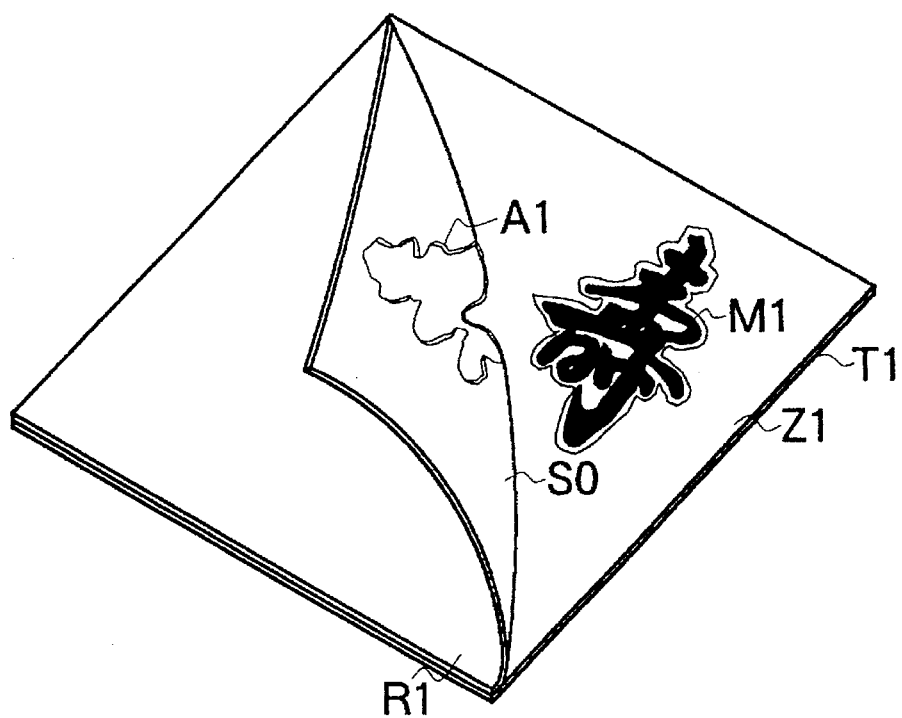
FIG. 16 is a perspective view of the hot stamp print of FIG. 15, wherein the edible film including the layer of zein is peeled off the support, leaving behind an outline of the image on the support.

If zein layer R1 and edible material SO are cut along cutting line A1 surrounding image M1, so as to leave support T1 intact, then zein layer R1 and edible material SO surrounding image M1 may be peeled off from material Z1, which is weakly attached to support T1. Refer to FIG. 16. This enables image M1 to remain on zein layer R1.

Figure 17:
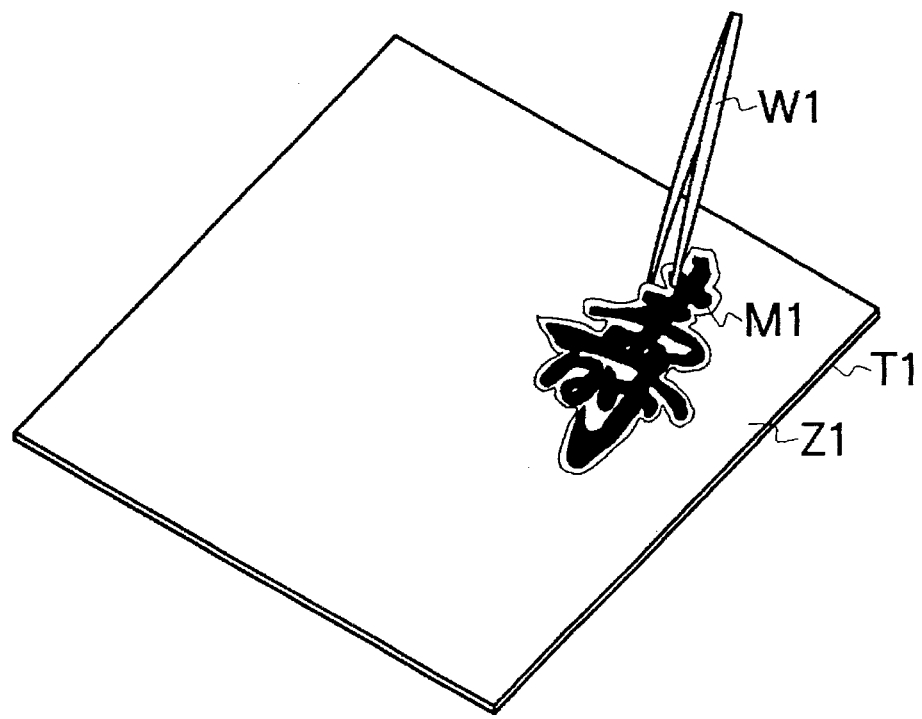
FIG. 17 is a perspective view of the hot stamp printing process of FIG. 16, wherein the image left on the support is being peeled within film from the adhesive layer on the support by means of a plier.

Accordingly, a patch of a laminate corresponding to image M1, exemplified by FIG. 17, wherein the laminate formed as shown in FIG. 14, is left attached to material Z1, supported by support T1.

It is noted that edible material SO, in view of its high water solubility, tends to curl excessively. However, adhesion of material Z1 to support T1, helps prevent edible material SO from curling, before and after the hot stamping process. This allows for image M1, which was previously cut along the cutting line A1, to be easily peeled together with edible material SO from the material Z1, which is supported by support T1. Referring to FIG. 17, image M1 can be peeled easily from material Z1 with the aid of college pliers W1 as well as human fingers. The resulting image M1 can thereafter be placed on an edible material substrate as described above.

The inner release layer 7, described previously as consisting essentially of a release agent composed mainly of silicone or acrylate copolymer, may further include shellac. Shellac may be applied to hot stamp material 5 in the form of an ethanol solution of shellac.

Shellac need not only be used as an adhesive, but may find use as a release agent in view of its superior thermoplastic properties. The use of shellac as a release agent is aided by the fact, that upon heating, as during the heat stamping process, shellac generally softens. Upon softening, shellac's adhesive properties are substantially impaired and is thus able to serve as an effective release agent.

Therefore, if adhesive layer 9 is formed of shellac, it softens considerably during the heating process, which substantially weakens the overall adhesiveness of the shellac, thus enabling it to function as a release agent.

However, zein layer R1 provided on edible material SO, can serves as an effective adhesive, thereby compensating for reduction in adhesion of the shellac. The reason for effectuating the process wherein support T2 is removed from laminate P1, as shown in FIG. 10, while the remaining edible material SO and the zein layer R1 are laid over and attached to the material Z1 supported by the support T1 to form the laminate P2 as shown in FIG. 12 will be explained.

In general, a conventional commercial edible material SO, consisting essentially of starch, exemplified by pullulan, is usually supported by a plastic film, such as a polyester film, having a thickness of about 20 microns, to facilitate its handling. However, the supporting film is generally very thin or weak to effectively prevent curling of the edible material SO, during or after the hot stamping.

In view of this drawback, thin support T2 is generally replaced by a thicker and stronger support T1 having a thickness of from 70 to about 100 microns. The support T1 is attached by means of the material Z1 to the edible material SO carrying the zein layer R1, attached thereto.

Described hereinafter is a hot stamping process, similar to the process illustrated in FIGS. 10 to 14, except that the support is composed of paper such as paper which is free from fluorescent dye, instead of a plastic film such as a polyester film. For purposes of this illustration, "paper" generally refers to one that is free of contaminants such as fluorescent dye.

Figure 18:
FIG. 18 is a cross-sectional view of a support formed of paper.
Figure 19:
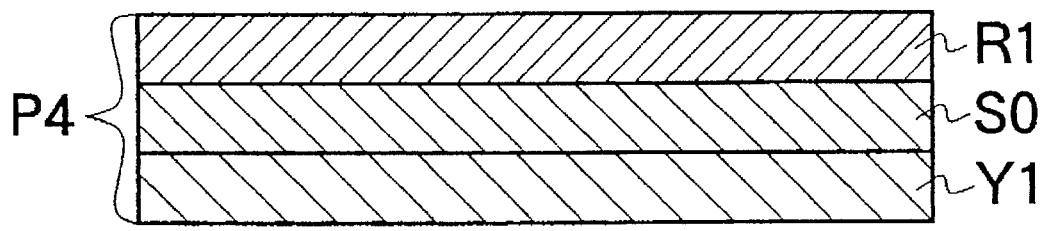
FIG. 19 is a sectional view of a laminate including a paper, a support, and a film and a layer of zein which are sequentially laminated on the paper support.

Referring to FIG. 19, a support T2 is removed from laminate P1 as shown previously in FIG. 10. Thereafter, laminate P1 without support T2 is laid over and attached to a support Y1, which is made of paper, as is illustrated in FIG. 18, to form a laminate P4.

Unlike support T1, which is mainly composed of a plastic film, the support Y1 is not provided with a material Z1. The resulting laminate P4 includes zein layer R1, edible material SO, and support Y1 which are sequentially laminated.

Referring to FIG. 13, hot stamp material 5 which includes base 6 made of a polyester film etc; an inner release layer 7, consisting essentially of one of silicone and acrylate copolymer; an intermediate layer 8 containing one of gold and silver coated on the inner release layer; and an outer adhesive layer 9 formed of shellac applied to the intermediate layer 8, is laid over laminate P4 as illustrated in FIG. 19, such that adhesive layer 9 is in a contacting relationship with zein layer R1.

After the hot stamping process, hot stamp material 5 is removed, leaving an imprint of intermediate layer 8 containing one of gold and silver together with adhesive layer 9 on laminate P4.

Figure 20:
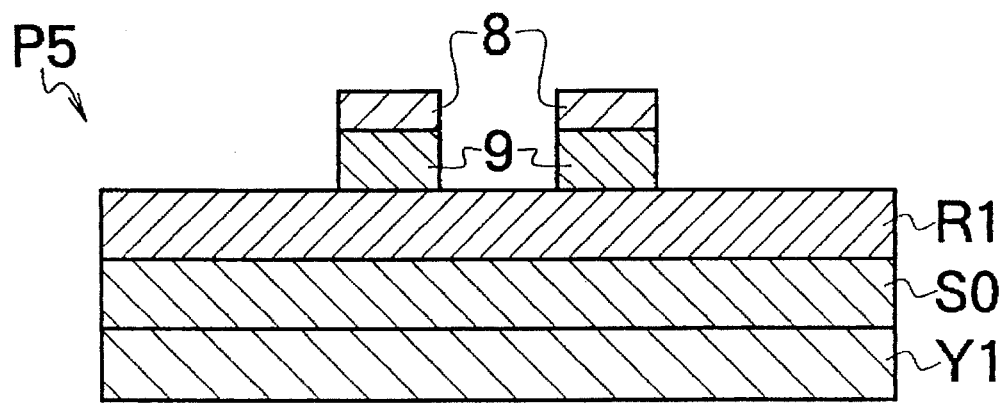
FIG. 20 a sectional view of a hot stamp printing formed by hot-stamping the hot stamp material of FIG. 1 on the laminate of FIG. 19.

Referring to FIG. 20, the process of hot stamping according to this embodiment includes forming a hot-stamped laminate P5 wherein support Y1, edible material SO, zein layer R1, adhesive layer 9 and intermediate layer 8 containing one of gold and silver are sequentially laminated thereon.

Figure 15:
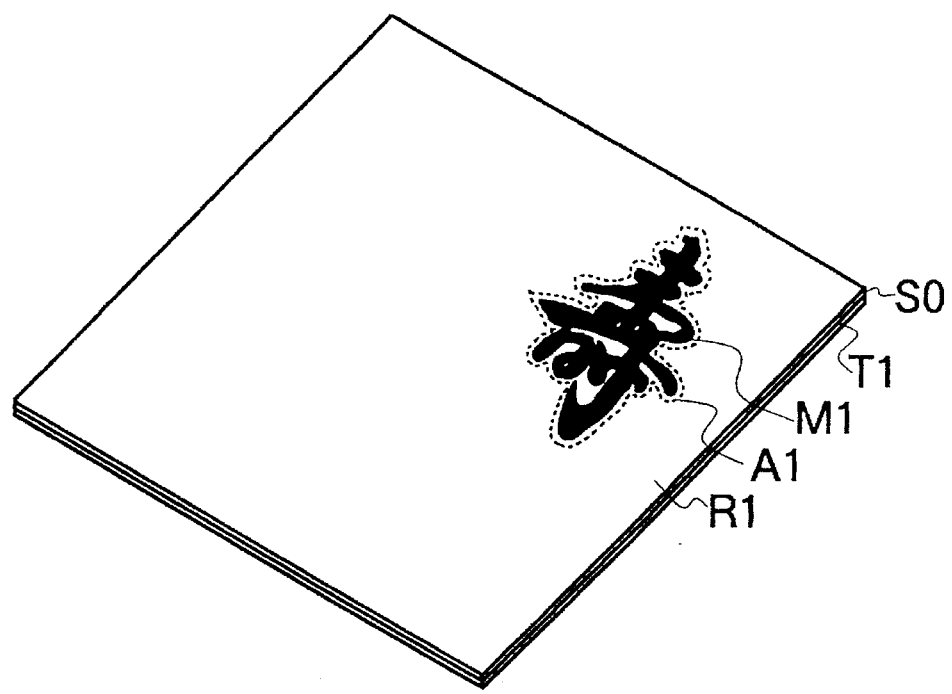
FIG. 15 is a perspective view of an example of a hot stamp print formed in accordance with FIG. 14.

Similar to the example illustrated in FIG. 15, only that portion of the intermediate layer containing one of gold and silver which forms image M1 corresponding to the pattern of metal plate Q1 is hot-stamped.

Essentially, image M1 is transferred and attached by means of adhesive layer 9 to zein layer R1.

It is noted that support Y1 which is made from paper does not require a substrate such as material Z1 between the support Y1 and the edible material SO composed mainly of starch such as pullulan, because pullulan generally softens upon heating thereby adhering to support Y1.

Accordingly, support Y1 has the added advantage of not requiring a substrate such as material Z1.

Further, because paper is inherently rigid and stiff compared to a plastic film, the support Y1 effectively prevents edible material SO from readily curling compared to its plastic counterpart.

A further advantage of using support Y1 is that its use substantially reduces the overall cost of practicing the present invention because unlike plastic films, paper is substantially less expensive and less toxic to the environment. White paper is preferable because it looks clean and is substantially hygienic.

The above-described supports T1, T2 and Y1 need not necessarily be cut in the form of cut sheets but may include rolls for example. The present invention is not limited to the above described embodiments or examples, but covers various modifications. For example, hot stamp material 5 may further include additional layers, besides inner release layer 7, intermediate layer 8 and outer adhesive layer 9 sequentially adhered to base layer 6.

As discussed above, additional layers may include a color layer interposed between the inner release layer 7 and intermediate layer 8 or between the intermediate layer 8 and outer adhesive layer 9. The additional color layer may be provided on either or both sides of intermediate layer 8 containing one of gold and silver. This option allows one to impart various colors to the resulting hot stamp. It is noted that the optional color layer should be consistent with the intermediate layer 8 containing one of gold and silver, in that the color layer should be edible and contain coloring additives that are not toxic to mammals including humans.

For example, if an edible red ink layer is provided as the optional color layer, in between the inner release layer 7 and intermediate layer 8 or between intermediate layer 8 and outer adhesive layer 9, the red color layer will, in turn, impart, a reddish tint to the intermediate layer 8 containing one of gold and silver.

Similarly, a mixed appearance of pearl and one of gold and silver can be imparted to intermediate layer 8 by incorporating pearl in the color layer.

The color layer consists of only coloring agents which are safe for consumption by mammalia. Suitable coloring agents for use in the color layer include at least one of food colors made of fruit pigments of orange, cranberry, Japanese persimmon, Gardenia, Kusagi (Clerodendron trichotomum THUMB), Uguisukagura (Lonicera caerulea L. var. emphyllocalyx NAKAI), and elderberry; vegetable pigments of red cabbage and purple cabbage; fish scale foil; sepia color; crawfish color; krill color; licorice color; caramel color; carob germ color; cacao color; turmeric oleoresin; madder color; annatto extract; alkanet color; and red kernel color.

Synthetic pigments may also be used. Indeed, a thin coating of pure silver or other edible metal may be provided as a coloring agent for use in the color layer.

Image M1 containing a character, pattern or design of one of a gold and silver imprint previously hot-stamped on the edible material, need not be limited to the above noted processes. Indeed, image M1 can be transferred to the underlying substrate by various methods, including, but not limited to, the process wherein image M1 is embossed by means of a hot stamp plate containing a pattern which in effect adds further features to image M1. Hot stamp material according to the present invention can be used to hot-stamp not only foods and edible materials such as edible film, but also, for example, materials made of paper, plastic, leather, or wood.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A hot stamp material comprising:
    a base;
    an inner release layer consisting essentially of at least one material selected from the group consisting of food additives, edible materials, and materials effective for coating food wrapping materials;
    an intermediate layer including an edible gold coating;
    an outer adhesive layer consisting of edible material; and
    wherein each of said inner release layer, intermediate layer and outer adhesive layer are laminated on said base.

2. The hot stamp material according to claim 1, wherein said intermediate layer consists of 94.4% gold, 4.9% silver, and 0.7% copper.

3. The hot stamp material according to claim 1, wherein said intermediate layer is applied in one of a sputtering or a vapor deposition operation.

4. The hot stamp material according to claim 1, further comprising an edible color layer interposed between said inner release layer and said intermediate layer.

5. The hot stamp material according to claim 1, further comprising an edible color layer interposed between said intermediate layer and said outer adhesive layer.

6. A hot stamp material according to claim 1, wherein said inner release layer consists essentially of silicone.

7. A hot stamp material according to claim 1, wherein said outer adhesive layer is shellac.

8. A hot stamp material comprising:
    a base;
    an inner release layer consisting essentially of at least one material selected from the group consisting of food additives, edible materials, and materials effective for coating food wrapping materials;
    an intermediate layer including a foil consisting of an edible form of gold;
    an outer adhesive layer consisting of edible material; and
    wherein each of said inner release layer, intermediate layer and outer adhesive layer are laminated on said base.

9. The hot stamp material according to claim 8, further comprising an edible color layer interposed between said inner release layer and said intermediate layer.

10. The hot stamp material according to claim 8, further comprising an edible color layer interposed between said intermediate layer and said outer adhesive layer.

11. The hot stamp material according to claim 8, wherein said release layer consists essentially of silicone.

12. The hot stamp material according to claim 8, wherein said adhesive layer is shellac.

13. The hot stamp material according to claim 8, wherein said foil is formed from a sheet of said edible form of gold, wherein said sheet is beaten or rolled to a thickness of from 0.0001 to 0.0002 min.

* * * * *